United States Patent [19]
Baynard et al.

[11] Patent Number: 5,996,958
[45] Date of Patent: Dec. 7, 1999

[54] COMBINATION FISHING ROD HOLDER

[76] Inventors: D. Calvin Baynard, Rte. 7, Box 1444, Manning, S.C. 29102; David A. Baynard, Rte. 1, Box 1407H, Alcolu, S.C. 29001

[21] Appl. No.: 09/076,430

[22] Filed: May 12, 1998

[51] Int. Cl.[6] .................................................. F16M 13/00
[52] U.S. Cl. .......................... 248/512; 43/21.2; 248/538; 248/539
[58] Field of Search .................... 248/512, 514, 248/538, 539, 515, 518; 43/21.2

[56]     References Cited

U.S. PATENT DOCUMENTS

| | | | |
|---|---|---|---|
| 1,467,834 | 9/1923 | Brunch | 43/21.2 |
| 2,934,298 | 4/1960 | Aleskin | 248/518 |
| 4,730,408 | 3/1988 | Miller | 43/21.2 X |
| 5,355,610 | 10/1994 | Sizemore et al. | 43/21.2 X |
| 5,478,041 | 12/1995 | Mayne | 248/514 |
| 5,519,959 | 5/1996 | Cross | 43/21.2 |
| 5,542,205 | 8/1996 | Updike | 43/21.2 X |

*Primary Examiner*—Ramon O. Ramirez
*Attorney, Agent, or Firm*—Cort Flint

[57]     ABSTRACT

A combination fishing rod holder is disclosed which includes a first rod holder in the form of a support cradle for supporting a fishing rod in a generally cantilevered fishing position. The first rod holder is affixed to a standard mounted to an associated structure such as the gunwale of a boat. A second rod holder is also carried by the standard which includes an upright holder for holding the fishing rod in a generally upright, travel position when the boat is moving over the water. Preferably the upright holder comprises a plurality of vertical, spaced holder rings which receive the butt of a fishing rod. The rings are affixed to a post secured in the clamp of an adjustable mount assembly which secures the second rod holder to the standard and/or first rod holder. The post may be moved in and out of the clamp radially with respect to the fishing rod butt so that free ends of the clamping jaws penetrate the rod holder rings and engage the butt to hold it securely in place during travel.

30 Claims, 4 Drawing Sheets

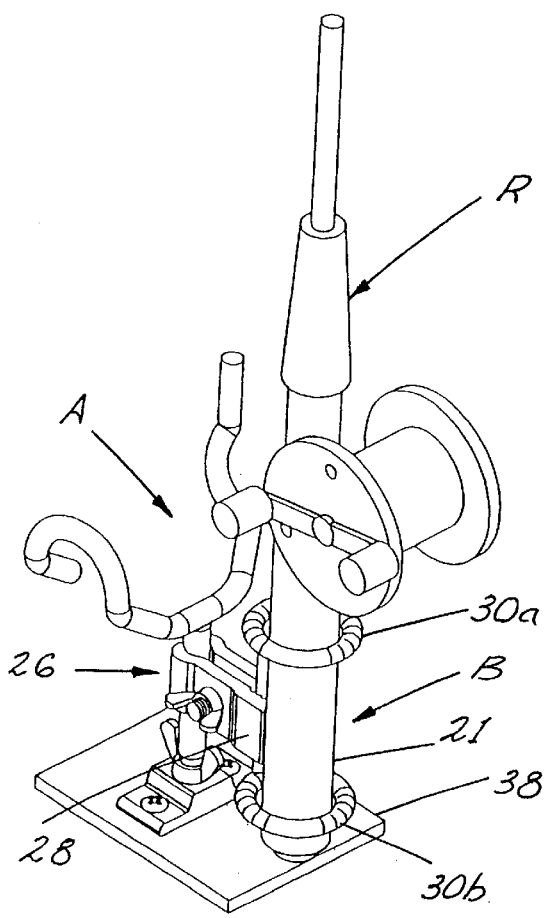
Fig. 2
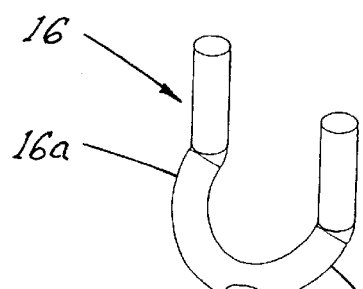
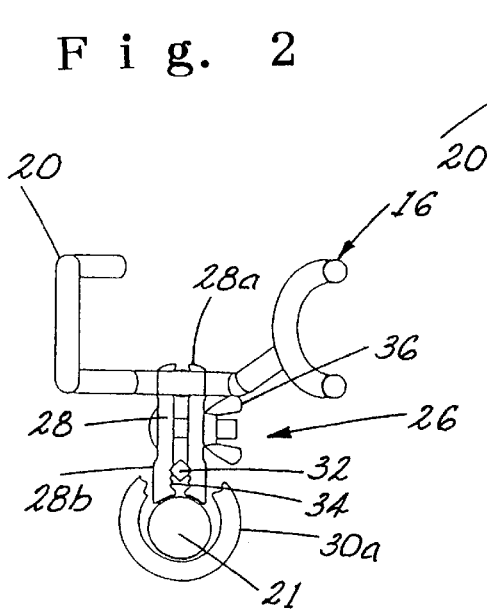
Fig. 4
Fig. 3

COMBINATION FISHING ROD HOLDER

BACKGROUND OF THE INVENTION

This invention relates to a rod holder for a fishing rod, and more particularly to a combination rod holder which holds a rod selectively in a fishing position or a generally upright traveling position.

Heretofore various rod holders have been proposed for attachment to an upper rail of a boat. Typically the rod holder includes a vertical standard which attaches to a mounting block affixed to the rail of the boat by means of a threaded attachment and the like. Typically the holder includes a front fork in which the rod is supported and a rear hook under which a butt of the rod is secured in a fishing position, i.e., a generally horizontal or slightly inclined position. However, the problem arises that when it is desired to move to a different location on the lake for fishing, the rod is not suitably held by the rod holder in the fishing position during travel, particularly over rough water. Thus it becomes necessary to lay the rod down somewhere in the boat often resulting in the line being tangled or breakage. If several fishing rods are being used, the problem of line entanglement and other inconveniences becomes even more problematic.

Accordingly, an object of the present invention is to provide a combination rod holder which effectively holds a fishing rod in a horizontal or slightly inclined fishing position, and also holds the fishing rod in a secure, generally upright position for travel.

Another object of the present invention is to provide a auxiliary rod holder for holding a fishing rod in a secure upright position during travel which may be added to an existing rod holder having only a fishing position.

Another object of the present invention is to provide a fishing rod holder for holding a fishing rod in a generally upright travel position wherein the fishing rod is securely held by the fishing rod holder in the travel position.

Still another object of the present invention is to provide a simple and reliable combination fishing rod holder having a first holder which holds the rod in a fishing position, and a second holder element which holds the fishing rod in a generally upright travel position in a simple yet reliable manner.

SUMMARY OF THE INVENTION

The above objectives are accomplished according to the present invention by providing a combination fishing rod holder for holding a fishing rod which comprises a standard adapted to be affixed to an associated structure; and a first rod holder carried by the standard having a rod support cradle for supporting the fishing rod in a fishing position. A second auxiliary rod holder is carried by the standard having an upright holder for supporting the rod generally upright in a travel position so that the support cradle supports the fishing rod during fishing, and the auxiliary holder securely holds the fishing rod in the travel position for movement over the water when not fishing. The upright holder includes a cylindrical tube for receiving a butt of the fishing rod, or a plurality of vertically spaced rod holder rings for receiving the fishing rod butt. Preferably, the upright holder includes three spaced rod holder rings wherein the middle ring assists in retaining the fishing rod should the rod butt be bumped out of a lower ring. An adjustable mount assembly attaches the second rod holder to the standard which may include a sleeve received over the standard which is rotatable to a desired rotated position on the standard.

Preferably, the adjustable mount includes a lateral arm, a first clamp carried by a first end of the lateral arm for attachment to the first rod holder, and a second clamp carried by a second end of the lateral arm for attachment to the second rod holder. Advantageously, the second clamp comprises a pair of spaced jaws having jaw ends; and the second rod holder comprises an upright post sandwiched between the jaws. The spaced jaws include indexes for clamping the post in different index position towards and away from the jaw ends. The upright holder comprises a plurality of generally vertical, spaced rod holder rings carried by the post for receiving a butt of the fishing rod. The jaw ends extend inwardly to engage the fishing rod in the travel position and secure the fishing rod in the upright holder. The lateral arm includes a pair of opposing arm elements, the first and second clamps being formed by respective first and second ends of the opposed arm elements, and an adjustable connector for selectively adjusting the spacing between the arm elements and hence a clamping force.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 2 is a perspective view of the combination fishing rod holder constructed according to the present invention mounted to an associated structure of a boat;

FIG. 3 is a perspective view of the combination rod holder unmounted;

FIG. 4 is a top plan view of the rod holder of FIG. 3;

DESCRIPTION OF A PREFERRED EMBODIMENT

Figure 1:
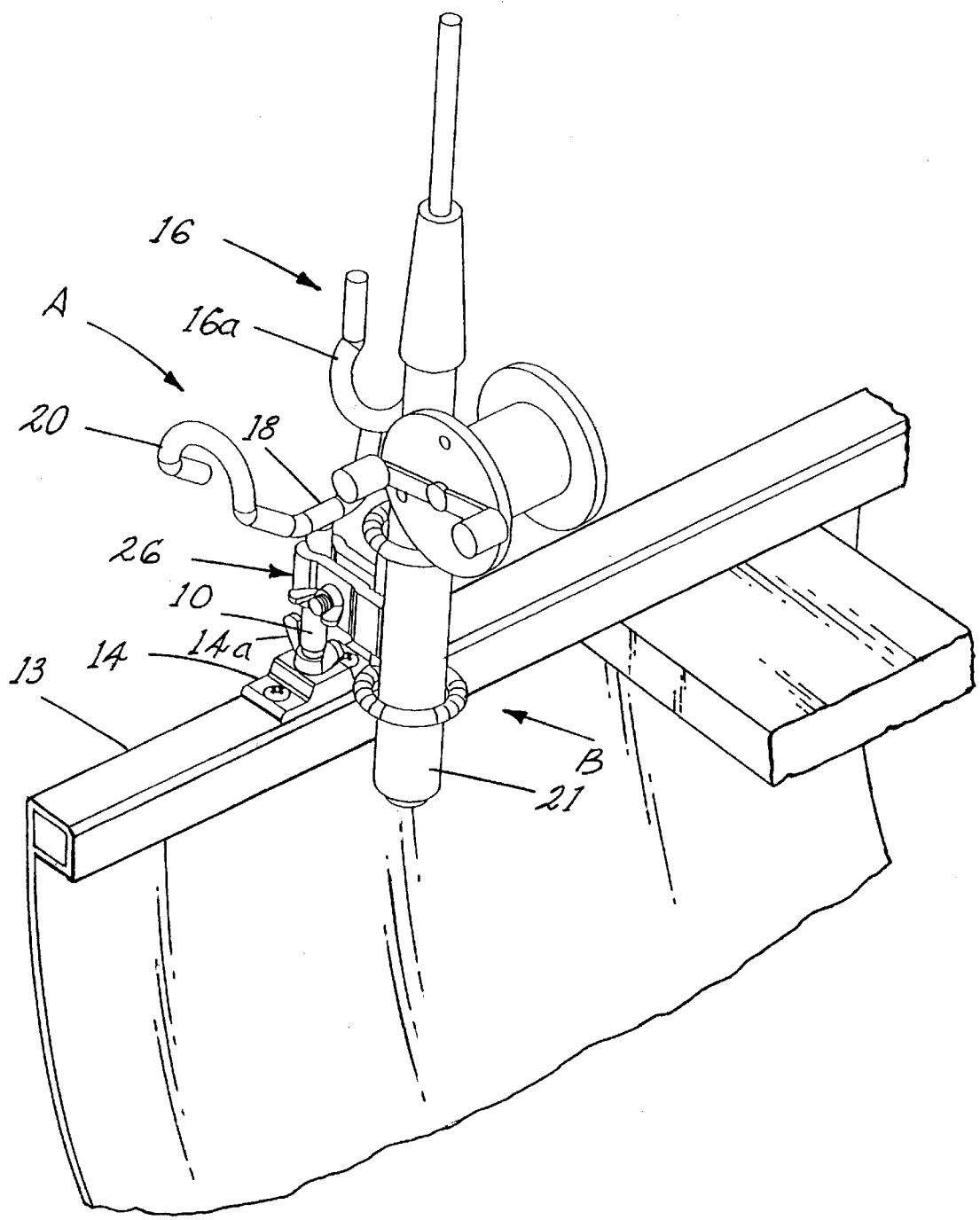
FIG. 1 is a perspective view of a combination fishing rod holder constructed according to the present invention mounted to the gunwale of a boat.

Referring now in more detail to the drawings, a combination fishing rod holder according to the invention is illustrated, designated generally as A. Combination fishing rod holder A includes a standard 10 affixed to a gunwale 13 of a boat by means of a mounting block 14 in which standard 10 is threadably attached and secured by a wing-nut 14a. Carried by standard 10 is a first, main rod holder, designated generally as 12. First rod holder 12 includes a rod support cradle having a forward fork 16 with a pair of arms 16a and 16b attached to standard 10 by means of a shank 18. A hook 20 is integral with an opposing end of shank 18 under which a butt 21 of the fishing rod R may be secured.

In accordance with the present invention, a second auxiliary rod holder, designated generally as B, is incorporated in the combination rod holder. Auxiliary rod holder B is carried by a mount assembly 26 secured to standard 10. In the illustrated embodiment, mount assembly 26 includes an adjustable clamp mount 28 having a first clamp 28a clampingly received over standard 10. Auxiliary rod holder includes an upright holder which may include a pair of vertically spaced rod holder rings 30a and 30b in which rod butt 21 is inserted and held in a generally upright position for travel. Rings 30a, 30b are affixed by any suitable means, such as welding and the like, to a rectangular post 32 which is clamped by a second clamp 28b of clamp mount 28.

As can best be seen in FIGS. 3 and 4, clamp 28b includes index means in the form of V-shaped notches 34 which grip the corners of the rectangular post in an anti-rotation manner. A wing-nut and screw 36 adjust the clamping force of the clamp mount 28. By adjusting the index position of rod 32 in notches 34, the rod may be tightly clamped, as explained below, and different type of rod/reel configurations may be accommodated. In addition, the adjustment allows for the vertical position of the upright holder to be raised so that the end of butt 21 is positioned well below bottom ring 30b and the butt does not bump out in travel. (FIG. 1). Thus, it can be seen that the adjustable mount provides an adjustment means for the vertical and rotated position of the upright holder. Clamps 28c and 28b are preferably provided by a lateral arm 27 having two spaced, opposed arm elements 27a, 27b. The clamps 28a, 28b are formed by the respective, contoured ends of the arm elements. In particular, ends 29 of arm elements 27a, 27b are contoured (FIGS. 3 and 4) to engage butt 21 when post 32 is adjusted properly in index notches 34 to lock the rod butt tightly in the upright holder. Ends 29 may be beveled or concave and may include vertical ribs 29a to engage the butt.

Figure 5:
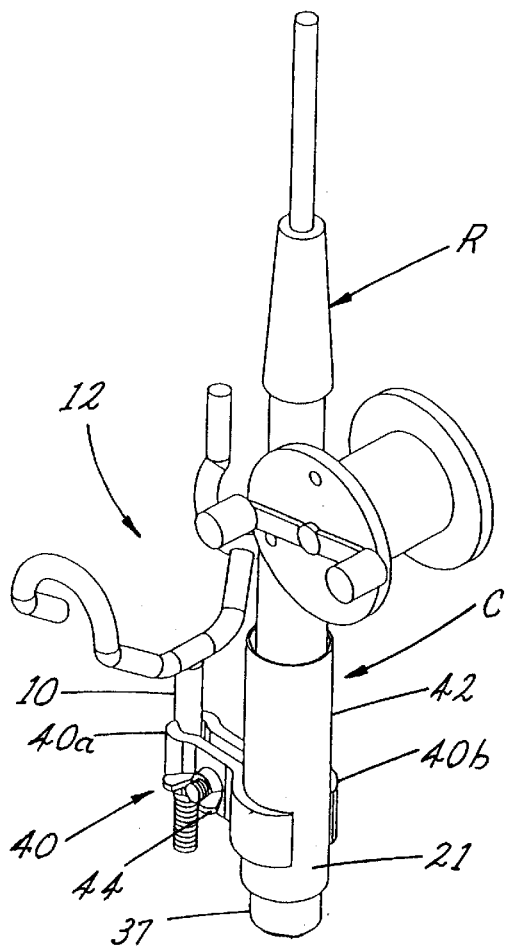
FIG. 5 is a perspective view of another embodiment of a combination fishing rod holder according to the present invention with the fishing rod held in a travel position.
Figure 7:
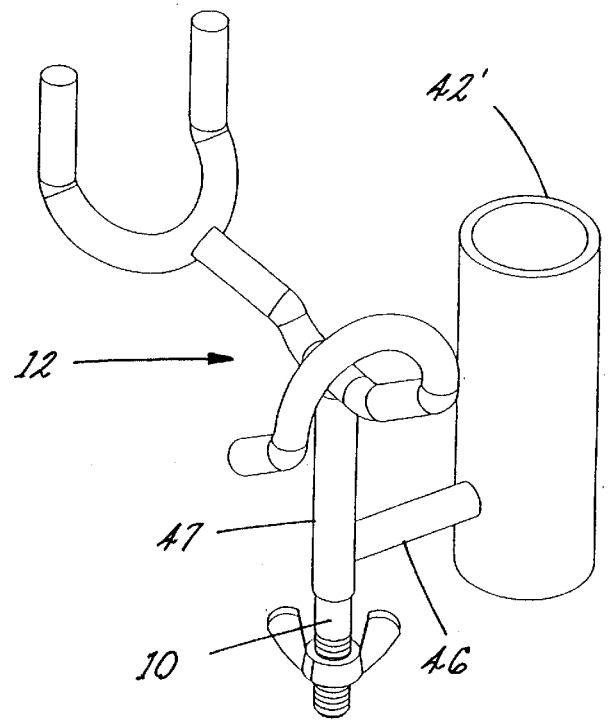
FIG. 7 is a perspective view of another embodiment of a combination fishing rod holder constructed according to the invention.
Figure 6:
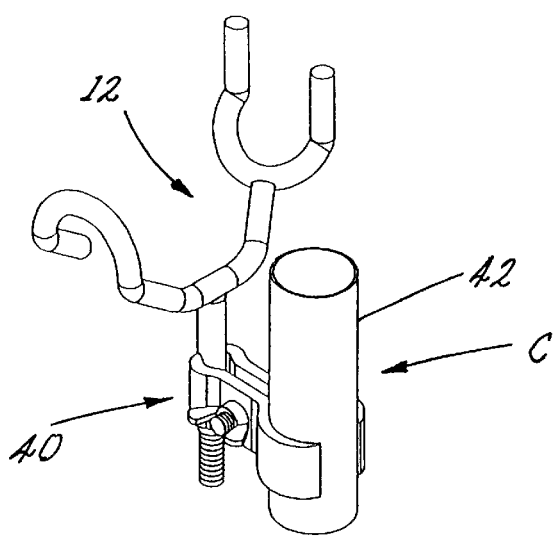
FIG. 6 is a perspective view of the combination fishing rod holder of FIG. 5 without the fishing rod.

Referring now to FIGS. 5 through 6, other embodiments of the invention will now be described. An auxiliary rod holder C is illustrated which includes a clamp mount assembly, designated generally as 40, which includes a pair of jaws defining a first clamp 40a clamped to the standard 10. A second clamp 40b is defined by jaws on the opposing end of clamp mount assembly 40 which clamps a holder 42 in the form of a cylindrical sleeve for receiving the butt end 37 of rod R. A screw and wing-nut assembly 44 provide an adjustable clamping force to clamps 40a, 40b. In FIG. 7 a holder 42 is illustrated which is fixed to a cantilevered rod 46 which in turn is affixed to slidable/rotatable sleeve 47 carried over standard 10.

Figure 8A:
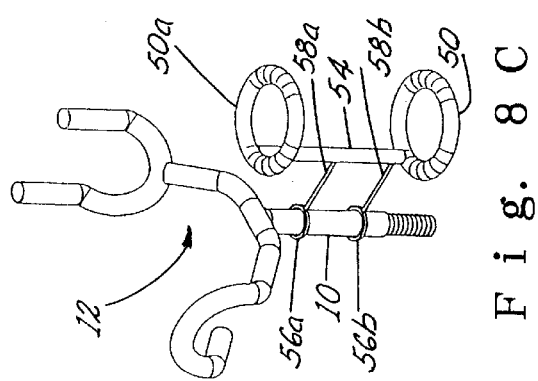
FIGS. 8A through 8C are rear perspective views illustrating combination rod holders according to the invention which may be affixed to an existing rod holder.
Figure 8B:
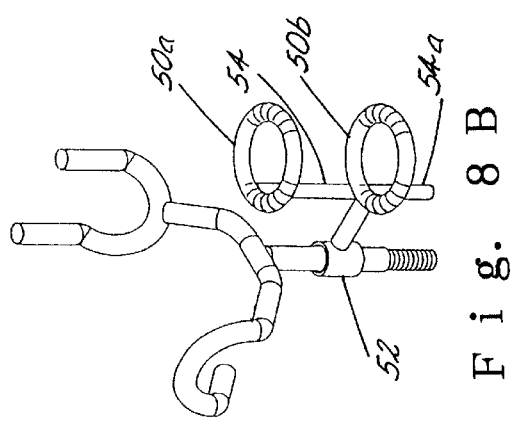
Figure 8C:
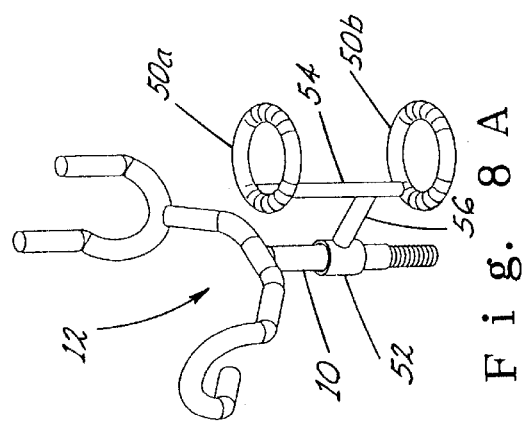

Referring now to FIGS. 8A through 8C, variations of the invention are illustrated. For example, in FIG. 8A, rod holder rings 50a and 50b may be carried by standard 10 by means of a sleeve 52 which surrounds the standard and may be retro-fitted to an existing main rod holder 12. Rod holder rings 50a are affixed to a post 54 which in turn is affixed to sleeve 52 by means of a cantilevered rod 56. In FIG. 8A, post 54 is extended at 54a to abut gunwale 12 or other associated structure such as at 38 (FIG. 2) so that butt 21 of the rod is displaced well below bottom rod holder ring 50b and does not slip out of the ring, i.e., ring 50b is raised well up on the butt 21 by the post end 54a engaging the gunwale. In FIG. 8C, rod holder rings 50a, 50b are secured to standard 10 by means of a pair of parallel rings 56a and 56b slidably carried on standard 10. Rings 56a, 56b are connected to post 54 by means of bars 58a, 58b.

Figure 9A:
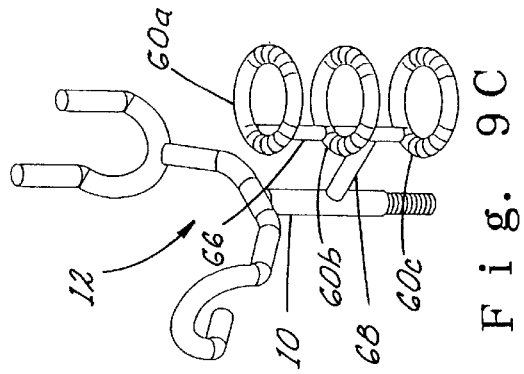
FIGS. 9A through 9C are rear perspective views of auxiliary rod holders affixed to a main rod holder.
Figure 9B:
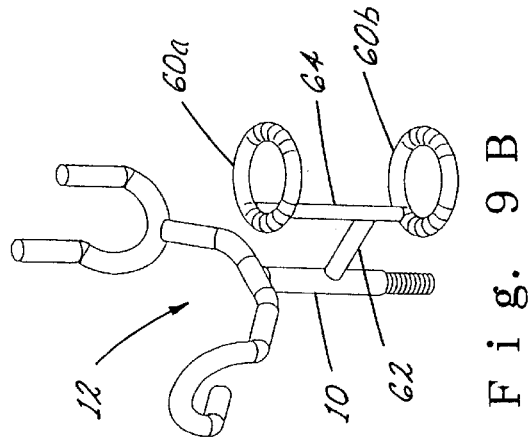
Figure 9C:
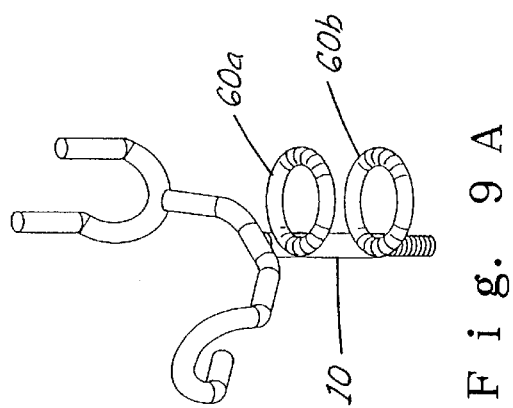

Referring now to FIGS. 9A through 9C, it will be seen that rod holder rings 60a and 60b are affixed directly to standard 10. The rod holder rings may be affixed by any suitable means, such as welding and the like. In FIG. 9A, rod holder rings 60a and 60b are affixed directly to standard 10 by means of a cantilevered rod 62 welded thereto, which in turn is welded to post 64. FIG. 9C illustrates an embodiment where three rod holder rings 60a through 60c are utilized. The rings are welded to a post 66 which in turn is welded to standard 10 by means of a cantilevered rod 68.

Thus it can be seen that an advantageous construction can be had for a combination fishing rod holder wherein a main fishing rod holder is provided for holding a fishing rod in a fishing position, and an auxiliary rod holder is provided for supporting a fishing rod in a travel position while the boat is moving over the water. The auxiliary fishing rod holder may be made as an integral part of the main fishing rod, or may be added as a retrofit to an existing fishing rod holder.

While a preferred embodiment of the invention has been described using specific terms, such description is for illustrative purposes only, and it is to be understood that changes and variations may be made without departing from the spirit or scope of the following claims.

What is claimed is,:

1. A combination fishing rod holder for holding a fishing rod comprising;

a standard adapted to be affixed to an associated structure;

a first rod holder carried by said standard having a rod support cradle for supporting said fishing rod in a fishing position;

a second auxiliary rod holder carried by said standard having an upright holder for supporting said rod generally upright in a travel position so that said support cradle supports the fishing rod during fishing, and said auxiliary holder securely holds the fishing rod in the travel position for movement over the water when not fishing; and a mount for attaching said second auxiliary rod holder to said standard.

2. The holder of claim 1 wherein said upright holder includes a cylindrical tube for receiving a butt of said fishing rod.

3. The holder of claim 1 wherein said upright holder includes a plurality of vertically spaced rod holder rings for receiving a butt of said fishing rod.

4. The holder of claim 3 wherein said upright holder includes three of said spaced rod holder rings wherein a middle one of said rings assists in retaining said fishing rod should said rod butt be bumped out of a lower ring.

5. The holder of claim 1 wherein said mount includes: an adjustable mount for attachment to said standard of said rod holder; and said upright holder being detachably carried by said mount.

6. The rod holder of claim 5 wherein said mount is removable from said standard.

7. The rod holder of claim 5 wherein said mount includes a sleeve which is received over said standard, and said sleeve is rotatable to a desired rotated position on said standard.

8. The rod holder of claim 7 including at least one laterally extending arm carried by said sleeve; and said upright holder being carried by an opposing end of said arm.

9. The rod holder of claim 5 wherein said adjustable mount includes:

a lateral arm;

a first clamp carried by a first end of said lateral arm for attachment to said first rod holder; and a second clamp carried by a second end of said lateral arm for attachment to said second rod holder.

10. The rod holder of claim 9 wherein said second clamp comprises a pair of spaced jaws having jaw ends; and said second rod holder comprises an upright post sandwiched between said jaws.

11. The rod holder of claim 10 wherein said spaced jaws include indexes for clamping said post in different index position towards and away from said jaw ends; and said jaw ends extend inwardly to engage said fishing rod in an upright travel position and secure said fishing rod in said upright holder.

12. The holder of claim 11 wherein said upright holder comprises a plurality of generally vertical, spaced rod holder rings carried by said post for receiving a butt of said fishing rod.

13. The holder of claim 11 wherein said lateral arm includes a pair of opposing arm elements, said first and second clamps being formed by respective first and second ends of said opposed arm elements, and an adjustable connector for selectively adjusting the spacing between said arm elements and hence a clamping force.

14. The rod holder of claim 9 wherein said upright holder comprises an upright tube having a hollow interior for receiving a butt of said fishing rod.

15. A combination fishing rod holder for holding a fishing rod comprising;

a standard for mounting to an associated structure; and said standard comprising a single upstanding post a rod support cradle for supporting said fishing rod carried by said standard; and an auxiliary rod holder carried by one of said standard and support cradle having an upright holder for supporting said rod generally upright so that said fishing rod may be supported in said support cradle during fishing and may be supported in said auxiliary holder for travel over the water when not fishing.

16. The holder of claim 15 wherein said upright holder includes a hollow tube for receiving a butt of said fishing rod.

17. The holder of claim 15 wherein said auxiliary holder includes a plurality of vertically spaced rings for receiving a butt of said fishing rod.

18. The holder of claim 17 wherein said upright holder includes three of said spaced rod holder rings wherein a middle one of said rings assists in retaining said fishing rod should said rod butt be bumped out of a bottom ring.

19. The holder of claim 15 including:

an adjustable mount for attachment to said standard of said rod holder; and said upright holder being carried by said mount.

20. The rod holder of claim 19 wherein said mount includes a sleeve which is received over said standard, and said sleeve is rotatable to a desired rotated position on said standard.

21. The rod holder of claim 19 wherein said mount includes a sleeve which is received over said standard, and said sleeve is rotatable to a desired rotated position on said standard.

22. The rod holder of claim 19 wherein said adjustable mount includes:

a lateral arm;

a first clamp carried by a first end of said lateral arm for attachment to said first rod holder; and a second clamp carried by a second end of said lateral arm for attachment to said second rod holder.

23. The rod holder of claim 22 wherein said second clamp comprises a pair of spaced jaws having jaw ends; and said second rod holder comprises an upright post sandwiched between said jaws.

24. The rod holder of claim 23 wherein said spaced jaws include indexes for clamping said post in different index position towards and away from said jaw ends; and said jaw ends extend inwardly to engage said fishing rod in an upright travel position and secure said fishing rod in said upright holder.

25. The holder of claim 24 wherein said upright holder comprises a plurality of generally vertical, spaced rod holder rings carried by said post for receiving a butt of said fishing rod.

26. The holder of claim 24 wherein said lateral arm includes a pair of opposing arm elements, said first and second clamps being formed by respective first and second ends of said opposed arm elements, and an adjustable connector for selectively adjusting the spacing between said arm elements and hence a clamping force.

27. A combination fishing rod holder for holding a fishing rod comprising;

a standard for mounting to an associated structure;

a first rod holder carried by said standard having rod support cradle for supporting said fishing rod in a fishing position;

a second rod holder carried by said standard having an upright holder for supporting said rod generally upright in a travel position so that said support cradle supports the fishing rod during fishing, and said auxiliary holder holds the fishing rod in the travel position for movement over the water when not fishing; and an adjustable mount assembly for mounting said second rod holder to said standard, including means for adjusting the vertical position of said second rod holder on said standard so that said upright holder may be adjusted to securely hold a butt of said fishing rod.

28. The rod holder of claim 27 wherein said adjustable mount assembly includes:

a lateral arm;

a first clamp carried by a first end of said lateral arm for attachment to said first rod holder;

a second clamp carried by a second end of said lateral arm for attachment to said second rod holder;

said second clamp comprising a pair of spaced jaws having jaw ends for adjustably clamping said second rod holder;

said spaced jaws including indexes for clamping said post in different index and position towards and away from said jaw ends of said jaws; and said jaws extend inwardly to engage said fishing rod in said travel position within said rod holder to secure said fishing rod therein.

29. The holder of claim 27 wherein said upright holder comprises a plurality of generally vertical, spaced rod holder rings carried by said post for receiving a butt of said fishing rod.

30. The rod holder of claim 27 wherein said upright holder comprises an upright tube having a hollow interior for receiving a butt of said fishing rod.

* * * * *